Patented Mar. 21, 1950

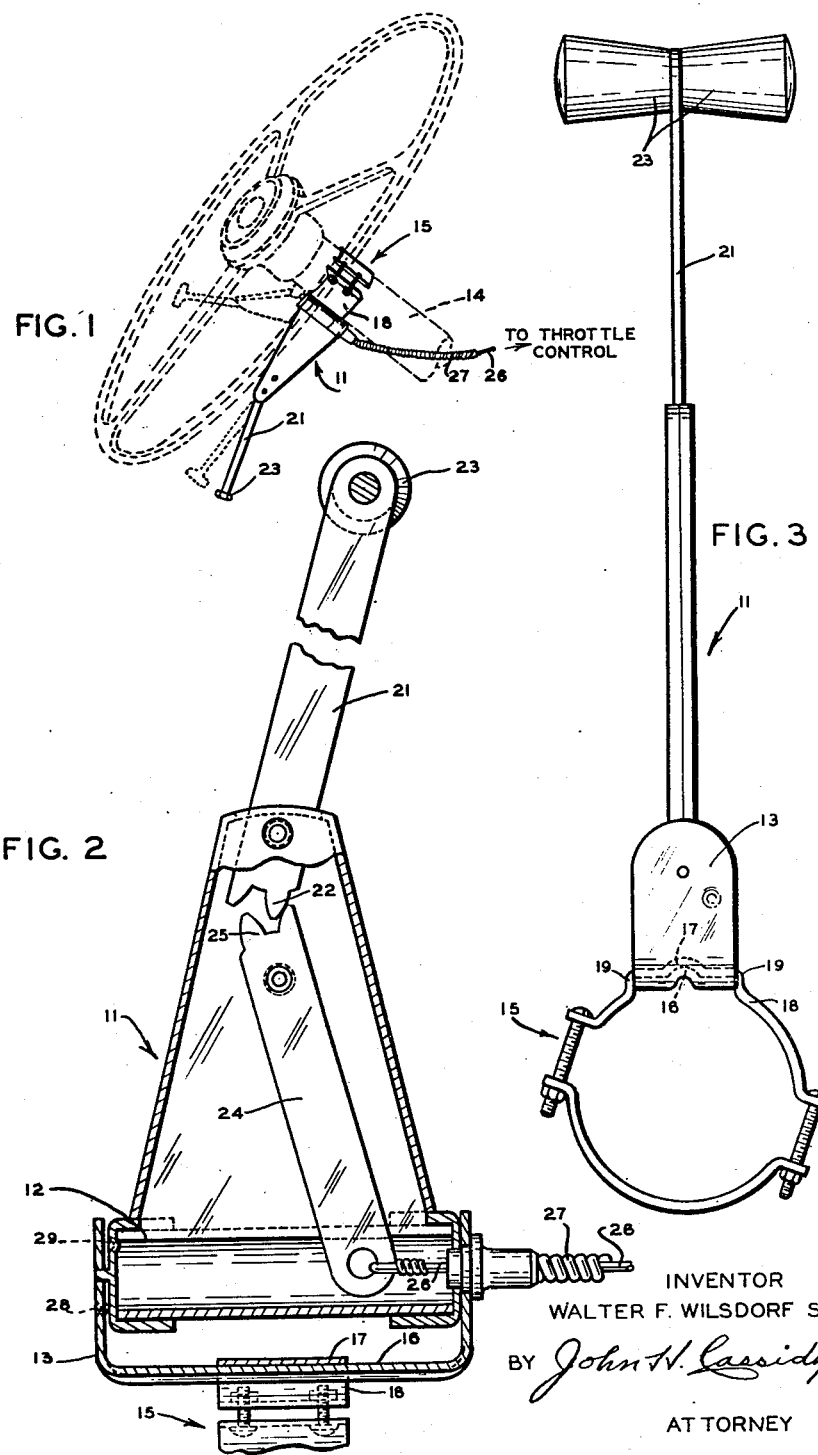

2,501,249

UNITED STATES PATENT OFFICE 2,501,249

AUTOMOBILE HAND ACCELERATOR

Walter F. Wilsdorf, Sr., St. Louis, Mo., assignor, by direct and mesne assignments, to Trans-Continental Industries, Incorporated, a corporation of Missouri Application March 7, 1947, Serial No. 732,952

2 Claims. (Cl. 74—487)

This invention relates to hand accelerators and more particularly to hand accelerators adapted to be secured to a steering column of an automobile.

Heretofore, driving on long trips has been tiresome to a driver. It has been difficult for the driver to relax and still keep his right foot constantly on the accelerator pedal. During long drives, his right foot and leg becomes cramped because of maintaining a rather constant pressure on the pedal. Use of a dashboard throttle of an automobile is presently the accepted method of relieving this fatigue to rest the driver, but, its use has inherent disadvantages. First, the automobile cannot be controlled as readily as with the foot accelerator, and second, the driver is not relaxed. Most hand throttles cannot govern the speed of the engine as easily as the foot accelerator. Either they are pulled out too far and the engine moves the automobile too fast or the throttle is not pulled out sufficiently far. Thus, the driver has to struggle in order to govern the speed of the automobile as he desires. He has to keep his mind on the road and at the same time has to adjust the dashboard throttle for the desired speed. Since dashboard throttles are mounted in an unhandy position for the driver to adjust when driving he cannot remain relaxed but must lean forward to reach the dashboard throttle.

Moreover, the dash throttle and the foot throttle are not adequate to prevent back-roll of the automobile which disadvantage is eliminated by the instant invention.

Therefore, it is an object of the invention to provide a hand accelerator adapted to be secured to a steering column of an automobile whereby the driver has the control of the speed of the automobile at his fingertips without excessive movement and can govern the engine as readily and as easily as he could with a foot accelerator pedal.

It is also an object of the invention to provide a hand accelerator for an automobile which is pivotally mounted on a steering column so as to be convenient to a driver in a number of positions about the circumference of a steering wheel for fingertip operation by either hand of the driver coincident with his steering of the automobile.

A further object of the invention is to provide a hand accelerator adapted to be secured to a steering column of an automobile which develops a large leverage resulting in smooth, easy, and accurate speed control, which is simple and durable in operation and which can be manufactured cheaply and by mass production processes.

While the scope of the invention is defined in the appended claims, the following detailed description when taken in conjunction with the accompanying drawing will disclose the invention, its construction and use.

Fig. 1 is a perspective view of a hand accelerator embodying the invention and showing its mode of attachment to a steering wheel column of an automobile, Fig. 2 is a partial sectional view of the device illustrated in Fig. 1 showing the parts thereof, and Fig. 3 is a plan view thereof.

As shown in the drawing, a hand accelerator is provided which has a case 11 with a cylindrical or barrel end 12 formed as a part thereof pivotally mounted in a bracket 13. Securing the bracket 13 to a steering column 14 of an automobile is a clamp 15. To adjustably secure the bracket 13 against the steering column 14, a ridge 16 is fashioned in a bracket 13 to cooperate with a ridge 17 on an inner portion 18 of the clamp 15. Bent portions 19 are further fashioned on the inner portion 18 of the clamp 15 to prevent side movement of the case 11 while mounted on the steering column 14.

Inside the case 11, a hand lever 21 is pivotally mounted inwardly from one end which has a segment gear 22. The opposite end has handle knobs 23. Disposed in and pivotally mounted at one end in the case 11 is a lever 24 which has a segment gear 25 on its pivot end to mesh with the segment gear 22 of the hand lever 21. A control wire 26 which slidably moves in a shield 27 is secured to the other end of the lever 24. The other end of the control wire 26 is connected preferably to the foot accelerator of the automobile. But, the control wire may be connected in the alternate to either the carburetor or the hand throttle. The shield 27 is, at its case end, mounted in the bracket 13 and at the other end, to a part of the automobile body or engine whichever may be the mode of connection of the control wire 26.

Provided on the bracket 13 is a dimple 28 which cooperates with an indentation 29 in the barrel end 12 of the case 11. The first of these elements provides a frictional engagement between the case 11 and the bracket 13 and both of them in cooperation provide a retaining position.

In the use of the device, the case 11 after being secured by the clamp 15 to the steering column 14 can be rotated to any position in an arc of approximately 180° under the steering wheel and will remain in its set position due to the frictional engagement between the case 11 and the bracket 13 (Fig. 1). In controlling the engine with the preferred mode of connection of the control wire 26, the hand lever 21 is moved upward toward the steering wheel to increase the engine speed. To reduce speed the driver's grasp on the knob end 23 is released to let the hand lever 21 move downwardly to the speed desired. It is apparent that in the preferred embodiment the hand lever 21 will move downwardly when released since the control wire 26 is connected to the foot accelerator which is spring tensioned so as to return, when released, to its idling position.

As shown in Fig. 1, the device may have several alternate positions for operation and can be controlled by movement by either the right or left hand. The device while being used may be rotated so as to be controlled first by one hand and then by the other leaving the feet and legs free for movement into the most comfortable position for relaxation. The driver may remain seated in a relaxed position and at the same time control the speed of the automobile as readily as he could with the foot accelerator.

While the device is illustrated as being bracketed to the steering column it will be apparent to those skilled in the art that the same may be incorporated within the column if desired.

Various changes may be made in the details of construction, within the scope of the appended claims, without departing from the spirit of this invention. Parts of the invention may be used without the whole and improvements may be added while retaining some or all of the advantages of the invention.

What is claimed is:

1. In a device for operating the throttle of an engine of an automobile having a steering wheel and a steering column, the improvement comprising a case, a bracket for pivotally mounting said case on the steering column, a control cable including a shield connected at one end thereof to said bracket and an inner control wire connected at one end to the engine throttle, a first lever having the other end of said inner control wire connected to one of its ends, said first lever being pivotally mounted in said case and being further adapted to slidably move said control wire in said shield, a segment gear on said first lever, a hand lever pivotally mounted in said case inwardly from one end thereof, and a segment gear on one end of said adapted to mesh with said segment gear on said first lever, said hand lever extending outwardly from said case to present its other end in nearness with a rim of the steering wheel.

2. In a hand accelerator for use with an automobile having a steering wheel, a steering column and an engine throttle, the improvement comprising a cable connected to the throttle to actuate the same, a lever attached to said cable to move the same, a handle adapted to move said lever, a case for housing said lever and supporting said handle, and a bracket for pivotally connecting said case to the steering column whereby said handle is positioned under the steering wheel for movement in a first direction to occupy a number of different positions radially of the steering wheel and in a second direction toward a rim of the steering wheel to open the throttle.

WALTER F. WILSDORF, SR.

REFERENCES CITED

The following references are of record in the file of this patent:

UNITED STATES PATENTS

| Number | Name | Date |
|---|---|---|
| 1,320,339 | Norby | Oct. 28, 1919 |
| 1,515,230 | Stringer | Nov. 11, 1924 |
| 1,658,554 | Denyes | Feb. 7, 1928 |
| 1,857,488 | Frazier | May 10, 1932 |
| 1,938,897 | Frazier | Dec. 12, 1933 |

FOREIGN PATENTS

| Number | Country | Date |
|---|---|---|
| 147,321 | Switzerland | May 31, 1931 |